(12) United States Patent
Frisk et al.

(10) Patent No.: US 7,608,334 B2
(45) Date of Patent: Oct. 27, 2009

(54) OXIDATIVELY STABLE MICROLAYERS OF GAS DIFFUSION LAYERS

(75) Inventors: Joseph W. Frisk, Oakdale, MN (US); Wayne M. Boand, Line Lakes, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 401 days.

(21) Appl. No.: 11/092,017

(22) Filed: Mar. 29, 2005

(65) Prior Publication Data

US 2006/0222840 A1 Oct. 5, 2006

(51) Int. Cl.
*B32B 27/20* (2006.01)
*H01M 8/10* (2006.01)
*H01M 6/18* (2006.01)

(52) U.S. Cl. .................. 428/421; 428/422; 429/30; 429/46; 429/309; 429/316

(58) Field of Classification Search ................ None
See application file for complete search history.

(56) References Cited

U.S. PATENT DOCUMENTS

| | | | |
|---|---|---|---|
| 3,969,145 A * | 7/1976 | Grevstad et al. | 429/26 |
| 4,157,327 A * | 6/1979 | Martin et al. | 523/307 |
| 4,551,220 A | 11/1985 | Oda et al. | |
| 5,658,670 A | 8/1997 | Fukushi et al. | |
| 6,020,083 A | 2/2000 | Breault et al. | |
| 6,465,041 B1 | 10/2002 | Frisk et al. | |
| 6,703,068 B2 | 3/2004 | Hintzer et al. | |
| 6,733,915 B2 | 5/2004 | Barton et al. | |
| 6,756,146 B2 | 6/2004 | Mlinar et al. | |
| 6,844,286 B2 | 1/2005 | Kohler et al. | |
| 2003/0098237 A1 | 5/2003 | Clark et al. | |
| 2003/0134178 A1 | 7/2003 | Larson | |
| 2004/0009389 A1 | 1/2004 | Sakai et al. | |
| 2004/0096716 A1 | 5/2004 | Pierpont et al. | |
| 2006/0102880 A1 | 5/2006 | Molnar et al. | |
| 2006/0177727 A1 * | 8/2006 | Ruth et al. | 429/44 |

FOREIGN PATENT DOCUMENTS

| | | |
|---|---|---|
| EP | 1 256 138 B1 | 2/2001 |
| EP | 1435672 A1 * | 7/2004 |
| WO | WO 00/09597 | 2/2000 |
| WO | WO 02/42372 | 5/2002 |
| WO | WO 2004/094491 | 11/2004 |

OTHER PUBLICATIONS

Translation of EP-1435672-A1 (See above.).*
Litster; S., et ai., "PEM fuel cell electrodes", *Journal of Power Sources*, Elsevier, Amsterdam, NL, vol. 130. Nos. 1-2. pp. 61-76. (May 2004).
Tervoort, T., et al., "Melt-Processable Poly(tetrafluoroethylene)", *Macromolecules*, ACS, Washington, DC, US, vol. 33, pp. 6460-6465, (Jul. 2000).

* cited by examiner

*Primary Examiner*—Ramsey Zacharia
(74) *Attorney, Agent, or Firm*—Philip Y. Dahl; Brian Morrison

(57) ABSTRACT

The present invention is a microlayer for use with an electrically conductive porous substrate of a gas diffusion layer. The microlayer includes carbon particles and a polymeric composition of first highly-fluorinated polymers that are non-melt processable and second highly-fluorinated polymers that are melt processable.

12 Claims, 4 Drawing Sheets

US 7,608,334 B2

OXIDATIVELY STABLE MICROLAYERS OF GAS DIFFUSION LAYERS

This invention was made with Government support under Cooperative Agreement DE-FC36-03GO13098 awarded by DOE. The Government has certain rights in this invention.

FIELD OF THE INVENTION

The present invention relates to gas diffusion layers for use in electrochemical cells, such as fuel cells. In particular, the present invention relates to microlayers of gas diffusion layers, where the microlayers are oxidatively stable to help preserve performance of the electrochemical cells.

BACKGROUND OF THE INVENTION

Fuel cells are electrochemical cells that produce usable electricity by the catalyzed combination of a fuel such as hydrogen and an oxidant such as oxygen. In contrast to conventional power plants, such as internal combustion generators, fuel cells do not utilize combustion. As such, fuel cells produce little hazardous effluents. Fuel cells convert hydrogen fuel and oxygen directly into electricity, and can be operated at higher efficiencies compared to internal combustion generators.

A fuel cell such as a proton exchange membrane (PEM) fuel cell typically contains a membrane electrode assembly, which consists of a catalyst coated membrane disposed between a pair of gas diffusion layers. The catalyst coated membrane itself typically includes an electrolyte membrane disposed between a pair of catalyst layers. The respective sides of the electrolyte membrane are referred to as an anode portion and a cathode portion. In a typical PEM fuel cell, hydrogen fuel is introduced into the anode portion, where the hydrogen reacts and separates into protons and electrons. The electrolyte membrane transports the protons to the cathode portion, but prevents the passage of electrons. This allows a current of electrons to flow through an external circuit to the cathode portion to provide power. Oxygen is introduced into the cathode portion and reacts with the protons and electrons to form water and heat.

BRIEF SUMMARY OF THE INVENTION

The present invention is directed to a microlayer for use with an electrically conductive porous substrate of a gas diffusion layer, where the microlayer includes carbon particles and a polymer composition. The polymer composition includes highly-fluorinated polymers that are non-melt processable and highly-fluorinated polymers that are melt processable. The microlayer is oxidatively stable, electrically conductive, and provides good bonding adhesion between the electrically conductive porous substrate and a catalyst coated membrane.

Unless otherwise explicitly stated, the following definitions apply herein:

"Highly-fluorinated" means containing fluorine in an amount of about 40% or more by weight.

"Melt flow index/melt flow indices" mean a melt flow index having units in grams/10 minutes, as measured pursuant to ASTM D1238-00.

"Graphitized carbon particles" means carbon particles that substantially exhibit a three-dimensional hexagonal crystalline order, irrespective of structural defects.

While the above-identified drawing figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale.

DETAILED DESCRIPTION

Figure 1:
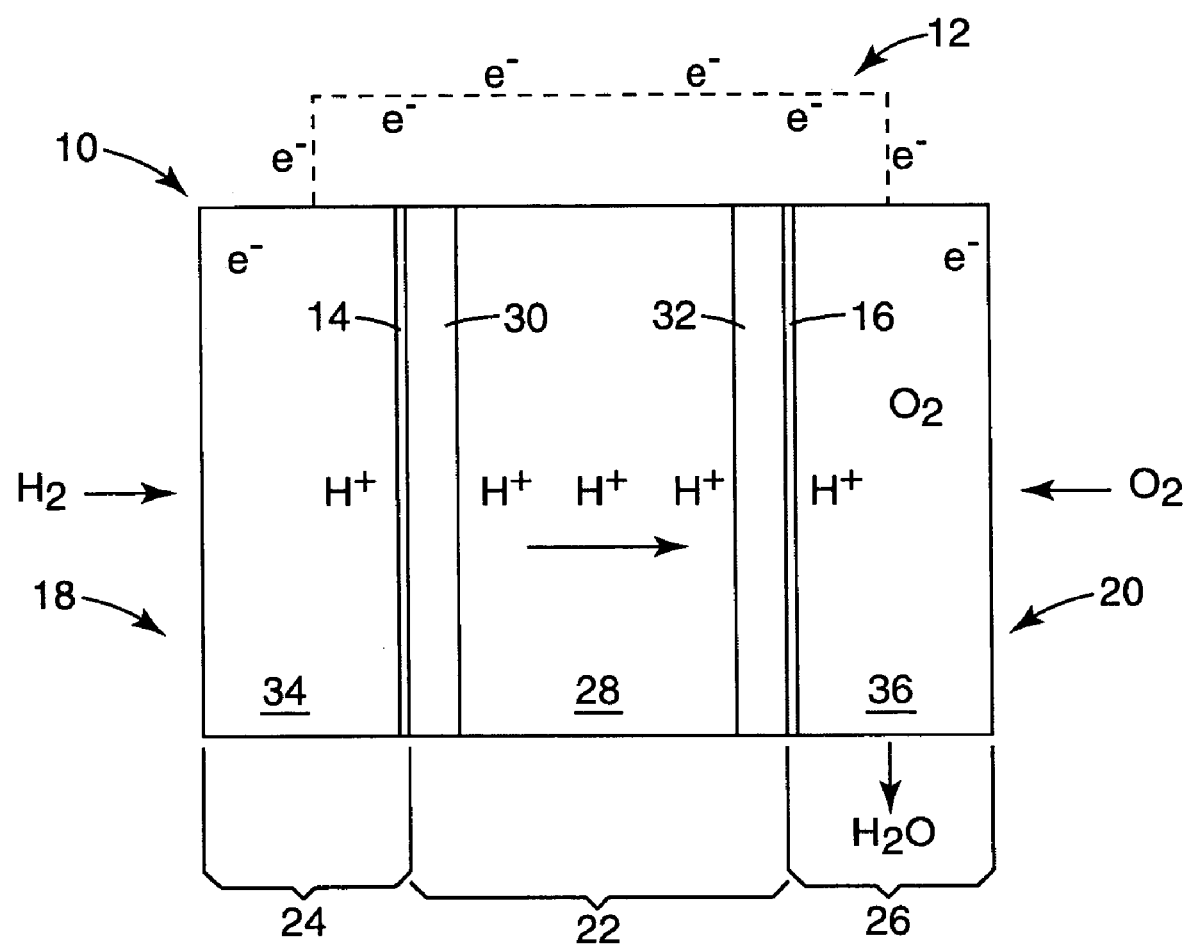
FIG. 1 is a schematic illustration of a membrane electrode assembly in use with an external electrical circuit.

FIG. 1 is an illustration of membrane electrode assembly 10 in use with external electrical circuit 12, where membrane electrode assembly 10 includes microlayers 14 and 16 of the present invention. Membrane electrode assembly 10 is suitable for use in electrochemical cells, such as PEM fuel cells, and further includes anode portion 18, cathode portion 20, catalyst coated membrane 22, and gas diffusion layers 24 and 26. Anode portion 18 and cathode portion 20 generally refer to the anode and cathode sides of membrane electrode assembly 10. Catalyst coated membrane 22 is disposed between gas diffusion layers 24 and 26, where gas diffusion layer 24 is located at anode portion 18 of membrane electrode assembly 10 and gas diffusion layer 26 is located at cathode portion 20 of membrane electrode assembly 10.

Catalyst coated membrane 22 may be any suitable catalyst coated membrane, and includes electrolyte membrane 28 disposed between catalyst layers 30 and 32. Gas diffusion layer 24 includes microlayer 14 of the present invention and substrate 34, where microlayer 14 is disposed between catalyst layer 30 and substrate 34. Similarly, gas diffusion layer 26 includes microlayer 16 of the present invention and substrate 36, where microlayer 16 is disposed between catalyst layer 32 and substrate 36. In an alternative embodiment of the present invention, catalyst layers 30 and 32 may be initially coated on gas diffusion layers 24 and 26 rather than on electrolyte membrane 28.

Substrates 34 and 36 may each be any suitable electrically conductive porous substrate, such as. carbon fiber constructions (e.g., woven and non-woven carbon fiber constructions). Examples of commercially available carbon fiber constructions include trade designated "AvCarb P50" carbon fiber paper from Ballard Material Products, Lowell, Mass.; "Toray" carbon paper which may be obtained from Electro-Chem, Inc., Woburn, Mass.; "SpectraCarb" carbon paper from Spectracorp, Lawrence, Mass.; "AFN" non-woven carbon cloth from Hollingsworth & Vose Company, East Walpole, Mass.; and "Zoltek" carbon cloth from Zoltek Companies, Inc., St. Louis, Mo. Substrates 34 and 36 may also be treated to increase or impart hydrophobic properties. For example, substrates 34 and 36 may each be treated with highly-fluorinated polymers, such as polytetrafluoroethylene (PTFE) and fluorinated ethylene propylene (FEP).

The carbon fiber constructions of substrates 34 and 36 generally have coarse and porous surfaces, which exhibit low bonding adhesion with catalyst layers 30 and 32, respectively. This reduces the conductive contact between catalyst layer 30 and gas diffusion layer 24, between and catalyst layer 32 and gas diffusion layer 26. To increase the bonding adhesion, microlayer 14 is coated to the surface of substrate 34 and adjacent catalyst layer 30, and microlayer 16 is coated to the surface of substrate 36 adjacent catalyst layer 32. This smoothens the coarse and porous surfaces of substrates 34 and 36, which provides good bonding adhesion with catalyst layers 30 and 32.

During operation of membrane electrode assembly 10, hydrogen fuel ($H_2$) is introduced into gas diffusion layer 24 at anode portion 18. The hydrogen fuel passes through substrate 34 and microlayer 14 of gas diffusion layer 24, and over catalyst layer 30. At catalyst layer 30, the hydrogen fuel is separated into hydrogen ions ($H^+$) and electrons ($e^-$). The electrolyte membrane 28 only permits the hydrogen ions to pass through to reach catalyst layer 32 and gas diffusion layer 26. The electrons cannot pass through electrolyte membrane 28. As such, the electrons flow through external electrical circuit 12 in the form of electric current. This current can power an electric load, such as an electric motor, or be directed to an energy storage device, such as a rechargeable battery. Oxygen ($O_2$) is introduced into gas diffusion layer 26 at cathode portion 20. The oxygen passes through substrate 36 and microlayer 16 of gas diffusion layer 26, and over catalyst layer 32. At catalyst layer 32, oxygen, hydrogen ions, and electrons combine to produce water and heat.

During this operation, microlayers 14 and 16 are exposed to oxidizing environments. This is particularly true for microlayer 16, which is directly exposed to the oxygen at cathode portion 20. In conventional fuel cells, the corresponding microlayers have carbon particles that are susceptible to oxidation. The oxidation modifies the surface energy of the carbon particles, and results in condensation of fluids within the microlayers. The condensation is commonly referred to as "flooding", which undesirably blocks the porous pathways of the microlayers, and restricts the flow of the hydrogen fuel, oxygen, and product fluid. This correspondingly reduces performance in the conventional fuels cells.

Microlayers 14 and 16 of the present invention, however, have good oxidative stability and provide good bonding adhesion between catalyst coated membrane 22 and substrates 34 and 36, respectively. Microlayers 14 and 16 are composed of carbon particles and a polymeric composition. The carbon particles are incorporated to preserve the electrical conductance between catalyst coated membrane 22 and substrates 34 and 36 (i.e., between catalyst coated membrane 22 and substrate 34, and between catalyst coated membrane 22 and substrate 36). Examples of suitable carbon particles include primary particles (average sizes ranging from about 1 nanometer (nm) to about 100 nm), primary aggregates of primary particles (average sizes ranging from about 0.01 micrometers to about 1 micrometer), secondary aggregates of primary aggregates (average sizes ranging from 0.1 micrometers to about 10 micrometers), agglomerates of aggregates (average sizes greater than about 10 micrometers), and combinations thereof. Examples of particularly suitable carbon particles include primary particles, primary aggregates, and combinations thereof.

Suitable carbon particles include carbon black, such as oil-furnaced carbon black, which is commercially available under the trade designation "Vulcan XC-72" carbon black from Cabot Corporation, Billerica, Mass.; and acetylene black, which is commercially available under the trade designation "Shawinigan Black, Grade C55" carbon black from Chevron Phillips Chemical Company, LP, Baytown, Tex. Graphitized carbon particles are also desirable, as they generally exhibit good stability versus oxidation.

The polymeric composition of microlayers 14 and 16 includes a combination of highly-fluorinated polymers that are non-melt processable (NMP polymers) and highly-fluorinated polymers that are melt processable (MP polymers). As discussed below, it is believed that the NMP polymers provide good bonding adhesion between catalyst coated membrane 22 and substrates 34 and 36, while the MP polymers provide oxidative stability to the carbon particles of microlayers 14 and 16. In one embodiment of the present invention, the NMP polymers and the MP polymers are each perfluoropolymers.

Examples of suitable NMP polymers include highly-fluorinated polymers that exhibit melt flow indices of less than about 0.5 grams/10 minutes. Such highly-fluorinated polymers include PTFE, such as homopolymers of tetrafluoroethylene (TFE) copolymers of TFE and other monomers, and combinations thereof. Copolymers of TFE and perluoroalkylvinylethers are typically referred to as "modified PTFE" or "TFM" (e.g., trade designated DYNEON TFM, which is available from Dyneon, LLC, Oakdale, Minn). An example of a suitable monomer for use with TFE in the copolymer includes perfluoropropylvinylether.

Examples of suitable MP polymers include highly-fluorinated polymers that exhibit melt flow indices of at least about one gram/10 minutes. Examples of particularly suitable melt flow indices for the MP polymers range from about five grams/10 minutes to about ten grams/10 minutes. Such highly-fluorinated polymers include perfluoroalkoxyalkanes (PFA) (e.g., copolymers of TFE and perfluoroalkoxyvinylethers), FEP, perfluoroalkyl acrylates, hexafluoropropylene copolymers, terpolymers of tetrafluoroethylene/hexafluoropropylene/vinylidene fluoride (THV), copolymers of TFE and ethylene (ETFE), perfluoropolymers thereof, and combinations thereof.

Examples of suitable concentrations of the NMP polymers in the polymeric composition range from about 25% to about 70%, by weight, based on the entire weight of the polymeric composition, with particularly suitable concentrations ranging from about 30% to about 50%, by weight. The suitable and particularly suitable concentrations of the MP polymers are correspondingly the concentration differences between the polymeric composition and the NMP polymer.

Microlayers 14 and 16 may be applied to substrates 30 and 32, respectively, by coating an aqueous suspension to the surfaces of substrates 30 and 32. The aqueous suspension used to prepare of microlayers 14 and 16 includes a carrier, a surfactant, the carbon particles, and the polymeric composition. Examples of suitable carriers for use with in the aqueous suspension include water, alcohols, and combinations thereof. Examples of suitable surfactants include any surfactant capable of substantially dispersing or suspending the carbon particles and the polymeric composition in the carrier. The aqueous suspension may also include other materials, such as thickening agents, defoaming agents, emulsifiers, and stabilizers.

The concentrations of the carrier, the surfactant, the carbon particles, and the polymeric composition may vary depending on the components selected. Examples of suitable compositional concentrations of the aqueous suspension include about 0.1% to about 15% surfactant, about 1% to about 50% carbon particles, and about 0.1% to about 15% polymeric composition, by weight, based on the entire weight of the aqueous suspension. Suitable concentrations of the carrier are correspondingly the concentration differences between the aqueous suspension and the sum of the above-listed components.

The aqueous suspension may be coated using a variety of methods, such as hand methods, machine methods, hand brushing, notch bar coating, wire-wound rod coating, fluid bearing coating, slot-fed knife coating, and three-roll coating. The coating may be achieved in one pass or in multiple passes.

After the aqueous suspension is coated on substrates 30 and 32, substrates 30 and 32 may initially be heated to sufficient temperatures and durations to substantially remove the carrier, the surfactant, and decomposition products of the surfactant. After the initial heating, microlayers 14 and 16 substantially retain the relative concentrations of the carbon particles and the polymeric composition as provided in the aqueous suspension. Examples of suitable compositional concentrations in each of microlayers 14 and 16 (following the initial heating) include from about 50% to about 90% carbon particles, and from about 10% to about 50% polymeric composition, by weight, based on the entire weight of the given microlayer. Examples of particularly suitable compositional concentrations in each of microlayers 14 and 16 (following the initial heating) include from about 75% to about 85% carbon particles, and from about 15% to about 25% polymeric composition, by weight, based on the entire weight of the given microlayer.

After the initial heating, a second heating step may then be used to sinter the polymeric composition. Examples of suitable sintering temperatures and durations include temperatures and durations capable of sintering the NMP polymers and the MP polymers (e.g., about 330° C. for PTFE). While not wishing to be bound by theory, it is believed that the sintering allows the MP polymers to readily flow and distribute over the carbon particles. In contrast to the NMP polymers, which generally remain in a rigid gel-like state when sintered, the MP polymers are capable of coating portions of the carbon particles. This reduces the total surface area of the carbon particles exposed to the oxidizing environments, and consequentially increases the oxidative stability of microlayers 14 and 16.

It is further believed that the MP polymers may not completely coat the carbon particles, and exposed portions of the carbon particles may remain to help preserve electrical conductance. Moreover, the coatings of the MP polymers on the carbon particles may exist as thin layers that do not substantially reduce the electrical conductivity of the carbon particles. In either case, the electrical conductivities of the carbon particles of microlayers 14 and 16 are substantially preserved, despite the presence of the polymeric composition.

The oxidative stability of each of microlayers 14 and 16 is generally proportional to the concentration of MP polymers in the polymeric composition (i.e., inversely proportional to the concentration of NMP polymers). However, the bonding adhesion between catalyst coated membrane 22 and substrates 34 and 36 is generally inversely proportional to the concentration of MP polymers in the polymeric composition (i.e., proportional to the concentration of NMP polymers). For example, if the concentration of NMP polymers is high, the resulting microlayer provides good bonding adhesion, but exhibits reduced oxidative stability. The oxidative stability is believed to be reduced because the amount of MP polymers that coat the carbon particles is reduced. As discussed above, the NMP polymers are non-melt flowable and do not adequately coat the carbon particles.

Similarly, if the concentration of MP polymers is high, the resulting microlayer exhibits good oxidative stability, but the bonding adhesion is reduced. The bonding adhesion is believed to be reduced because the resulting microlayer exhibits a chalky or powdery texture after sintering. This correspondingly reduces the structural strength of the given microlayer, and consequentially prevents adequate bonding between a catalyst coated membrane (e.g., catalyst coated membrane 22) and a substrate (e.g., substrate 34).

The concentration ranges of the NMP polymers and the MP polymers in the polymeric composition of microlayers 14 and 16, as discussed above, are suitable concentrations that provide good oxidative stability to microlayers 14 and 16 and good bonding adhesion between catalyst coated membrane 22 and substrates 34 and 36, respectively. As such, microlayers 14 and 16 are capable of preserving fuel cell performance while also providing good conductive contact between catalyst coated membrane 22 and substrates 34 and 36, respectively.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

The following compositional abbreviations are used in the following Examples:

"PTFE": Polytetrafluoroethylene NMP polymer (60% solids by weight), commercially available under the trade designation "DuPont Grade 30 PTFE" from DuPont De Nemours & Company, Wilmington, Del.

"FEP": Fluorinated ethylene propylene MP polymer (55% solids by weight), commercially available under the trade designation "Dyneon FEP X6300" from Dyneon, LLC, Oakdale, Minn.

"VXC carbon black": Vulcan carbon black carbon particles, commercially available under the trade designations "Vulcan XC-72" and carbon black from Cabot Corporation, Billerica, Mass. (commonly referred to as VXC carbon black).

"C55 carbon black": Acetylene black carbon particles, commercially available under the trade designation "Shawinigan Black, Grade C55" carbon black from Chevron Phillips Chemical Company, LP, Baytown, Tex.

"Mazu defoamer": A silicone defoaming agent, commercially available under the trade designation "Mazu DF 210 SX" from BASF Corp., Mount Live, N.J.

"Amine oxide surfactant": 30% by weight of an dimethylcocoalkyl amine oxide surfactant in water.

"Tomah surfactant": 50% by weight of an amine oxide surfactant in water, commercially available under the trade designation "Tomah AO 455" from Tomah Products, Inc., Milton, Wis.

"CFP substrate": A carbon fiber paper substrate, commercially available under the trade designation "AvCarb P50 Carbon Fiber Paper" from Ballard Material Products, Lowell, Mass.

"Sulfuric acid": Sulfuric acid ($H_2SO_4$), commercially available from Aldrich Chemical Company, Milwaukee, Wis.

"CCCM": A catalyst coated membrane, which has an electrolyte membrane coated on each side with 0.4 milligrams/square centimeter of a platinum catalyst. The electrolyte membrane is a cast film commercially available under the trade designated "Nafion PFSA" from DuPont Corporation, Wilmington, Del. The platinum catalyst is commercially available from Aldrich Chemical Company, Milwaukee, Wis.

Examples 1-9 and Comparative Examples A and B

Gas diffusion layers of Examples 1-9 and Comparative Examples A and B were prepared pursuant to the following procedure. A stock mixture was initially formed by adding 13.35 kilograms of deionized water in a 22.7-liter mixing vessel. The deionized water was then mixed with a high-speed disk disperser blade at 1,000 rotations-per-minute (rpm). The high-speed disk disperser blade was operated with a Model ASSAM 0.5-horsepower air mixer, equipped with a 7.6-centimeter diameter Design A Cowles Blade, commercially available from INDCO Inc., New Albany, Ind. While mixing, nine grams of Mazu defoamer was added to the mixing vessel and mixed for five minutes. Next, 817 grams of the amine oxide surfactant was added to the mixing vessel while mixing. Finally, 1,845 grams of VXC carbon black was added to the mixing vessel while mixing. As the apparent viscosity of the stock mixture increased, the mixing speed was increased to 1,500 rpm to allow the stock mixture to flow in the mixing vessel.

Once all the carbon wetted out, a second mixer was added to the mixing vessel, which was operated at 6,000 rpm. The second mixer was a Model L2/Air 0.25-horsepower air driven rotor-stator mixer, commercially available from Silverson Machines, Inc., East Longmeadow, Mass., and was equipped with a square hole screen and a 2.5-centimeter diameter rotor. The stock mixture was then mixed with both mixers for two hours. After the two-hour mixing period, the mixers were removed and the stock mixture rested at ambient conditions for twelve hours. After the twelve hour period, most of the foam had broke and the remaining coarse foam broke quickly when stirred with a spatula. The resulting stock mixture had a composition by weight of 86.9% water, 11.6% VXC carbon black, 1.5% amine oxide surfactant, and a trace of Mazu defoamer.

Polymeric compositions of PTFE and FEP were then added in varying amounts to 500-gram samples of the stock mixture to provide aqueous suspensions for Examples 1-9 and Comparative Examples A and B. For each sample, the polymeric composition was stirred into the stock mixture by hand with a spatula until well mixed. 25 grams of Tomah surfactant was then added and mixed in by hand with a spatula, until well mixed. Table 1 provides the amounts of PTFE and FEP added to the 500-gram stock mixture samples, and the PTFE and FEP concentrations in the polymeric compositions, for the aqueous suspensions of Examples 1-9 and Comparative Examples A and B. In each aqueous suspension, the ratio of VXC carbon black to polymeric composition was four-to-one (i.e., four parts VXC carbon black to one part polymeric composition, by weight).

TABLE 1

| Sample | Grams of PTFE Added * | Grams of FEP Added * | Percent by Weight of PTFE ** | Percent by Weight of FEP ** |
|---|---|---|---|---|
| Comparative Example A | 0.0 | 25.4 | 0 | 100 |
| Example 1 | 2.4 | 23.6 | 10 | 90 |
| Example 2 | 6.0 | 19.7 | 25 | 75 |
| Example 3 | 7.0 | 18.0 | 30 | 70 |
| Example 4 | 9.5 | 14.5 | 40 | 60 |
| Example 5 | 12.0 | 13.0 | 50 | 50 |

TABLE 1-continued

| Sample | Grams of PTFE Added * | Grams of FEP Added * | Percent by Weight of PTFE ** | Percent by Weight of FEP ** |
|---|---|---|---|---|
| Example 6 | 14.0 | 10.0 | 60 | 40 |
| Example 7 | 16.5 | 7.5 | 70 | 30 |
| Example 8 | 18.1 | 6.6 | 75 | 25 |
| Example 9 | 21.7 | 2.6 | 90 | 10 |
| Comparative Example B | 24.1 | 0.0 | 100 | 0 |

* Amount added to 500 grams of the stock mixture.
** Based on the entire weight of the polymeric composition.

The aqueous suspensions were then ready to be coated as microlayers on CFP substrates to provide the gas diffusion layers of Examples 1-9 and Comparative Examples A and B. Prior to coating the microlayers, the CFP substrates were pre-treated. The pre-treatment involved gently mixing one kilogram of deionized water and 100 grams of FEP in a open pan. For each sample, a 20-centimeter by 25-centimeter piece of the CFP substrate was initially submerged in the water/FEP mixture for 30 seconds to treat the CFP substrate with the FEP. The treated CFP substrate was then hung vertically and allowed to dry at 25° C. for four hours.

After the drying period, the microlayer of the given aqueous suspension was coated onto the treated CFP substrate with a laboratory notch bar coater. The total gap setting of the notch bar was 300 micrometers. The treated CFP substrate was pulled through the notch bar by hand at a steady rate. Once coated, the resulting gas diffusion layer was hung vertically and allowed to dry at 25° C. for another four hour period. The gas diffusion layer was then placed in an oven at 380° C. for 15 minutes for sintering. The oven was a Lindberg/Blue M Model BF51842 Series oven, commercially available from Blue M Electric, A General Signal Company, Watertown, Wis. The gas diffusion layer was then removed from the oven and allowed to cool.

Examples 10-14 and Comparative Examples C and D

Gas diffusion layers of Examples 10-14 and Comparative Examples C and D were prepared pursuant to the following procedure. A stock mixture was initially formed by adding 10.61 kilograms of deionized water in a 22.7-liter mixing vessel. The deionized water was then mixed with a high-speed disk disperser blade at 1,000 rotations-per-minute (rpm). The high-speed disk disperser blade was operated with a Model AS5AM 0.5-horsepower air mixer, equipped with a 7.6-centimeter diameter Design A Cowles Blade, commercially available from INDCO Inc., New Albany, Ind. While mixing, 621 grams of the amine oxide surfactant was added to the mixing vessel. Next, 1,038 grams of C55 carbon black was added to the mixing vessel while mixing. As the apparent viscosity of the stock mixture increased, the mixing speed was increased to 1,500 rpm to allow the stock mixture to flow in the mixing vessel.

Once all the carbon wetted out, a second mixer was added to the mixing vessel, which was operated at 6,000 rpm. The second mixer was a Model L2/Air 0.25-horsepower air driven rotor-stator mixer, commercially available from Silverson Machines, Inc., East Longmeadow, Mass., and was equipped with a square hole screen and a 2.5-centimeter diameter rotor. The stock mixture was then mixed with both mixers for two hours. After the two-hour mixing period, the mixers were removed and the stock mixture rested at ambient conditions for twelve hours. After the twelve hour period, most of the foam had broke and the remaining coarse foam broke quickly when stirred with a spatula. The resulting stock mixture had a composition by weight of 90.0% water, 8.5% C55 carbon black, and 1.5% amine oxide surfactant.

Polymeric compositions of PTFE and FEP were then added in varying amounts to 200-gram samples of the stock mixture to provide aqueous suspensions for Examples 10-14 and Comparative Examples C and D. The polymeric compositions were stirred into the stock mixture by hand with a spatula until well mixed. Table 2 provides the amounts of PTFE and FEP added to the 200-gram stock mixture samples, and the PTFE and FEP concentrations in the polymeric compositions, for the aqueous suspensions of Examples 10-14 and Comparative Examples C and D. In each aqueous suspension, the ratio of C55 carbon black to polymeric composition was four-to-one (i.e., four parts C55 carbon black to one part polymeric composition, by weight).

TABLE 2

| Sample | Grams of PTFE Added * | Grams of FEP Added * | Percent by Weight of PTFE ** | Percent by Weight of FEP ** |
|---|---|---|---|---|
| Comparative Example C | 0.0 | 8.0 | 0 | 100 |
| Example 10 | 0.7 | 6.9 | 10 | 90 |
| Example 11 | 1.8 | 5.7 | 25 | 75 |
| Example 12 | 3.6 | 3.8 | 50 | 50 |
| Example 13 | 5.2 | 1.9 | 75 | 25 |
| Example 14 | 6.3 | 0.8 | 90 | 10 |
| Comparative Example D | 7.1 | 0.0 | 100 | 0 |

\* Amount added to 200 grams of the stock solution.
\*\* Based on the entire weight of the polymeric composition.

The aqueous suspensions were then ready to be coated as microlayers on CFP substrates to provide the gas diffusion layers of Examples 10-14 and Comparative Examples C and D. Prior to coating the microlayers, the CFP substrates were pre-treated. The pre-treatment involved gently mixing one kilogram of deionized water and 100 grams of FEP in a open pan. For each sample, a 20-centimeter by 25-centimeter piece of the CFP substrate was initially submerged in the water/FEP mixture for 30 seconds to treat the CFP substrate with the FEP. The treated CFP substrate was then hung vertically and allowed to dry at 25° C. for four hours.

After the drying period, the microlayer of the given aqueous suspension was coated onto the treated CFP substrate with a laboratory notch bar coater. The total gap setting was 300 micrometers. The treated CFP substrate was pulled through the notch bar by hand at a steady rate. Once coated, the resulting gas diffusion layer was hung vertically and allowed to dry at 25° C. for another four hour period. The gas diffusion layer was then placed in an oven at 380° C. for 15 minutes for sintering. The oven was a Lindberg/Blue M Model BF51842 Series oven, commercially available from Blue M Electric, A General Signal Company, Watertown, Wis. The gas diffusion layer was then removed from the oven and allowed to cool.

Oxidative Stability Test for Examples 1-14 and Comparative Examples A-D

The corrosion current densities of the gas diffusion layers of Examples 1-14 and Comparative. Examples A-D were quantitatively measured to determine how different component concentrations of the polymeric compositions affect the oxidative stability of the microlayers. The corrosion current density of a given sample is proportional to the amount of carbon particles in the sample being oxidized. As such, lower corrosion current densities correspond to greater oxidative stabilities.

For each gas diffusion layer, the microlayer side was placed in contact with a 0.5 molar sulfuric acid solution, which functioned as the electrolyte. As such, the microlayer was the working electrode. The working planar area of the microlayer in contact with the electrolyte was approximately 203 square centimeters. A mercury/mercury-sulfate electrode served as a reference electrode and a platinum mesh screen, having a diameter of 11.5 centimeters, served as a counter electrode. Both the reference and counter electrode were placed in the electrolyte. The test set-up was open to an ambient pressure and a temperature of 25° C. A potentiostat was used to perform potentiostatic scans on the samples at set voltages. The potentiostat was commercially available under the trade designation "Model 1280B Potentiostat" from Solartron, Inc., Farnborough, UK, and was controlled by Scribner Associates CorrWare software package. Potentiostatic scans, each five minutes in duration, were performed from the starting voltage of 1.0 volts to a final voltage of 2.0 volts, in increments of 0.1 volts. The voltages were reported relative to a normal hydrogen electrode. After each of the five-minute scans, the corrosion current density of the gas diffusion layer was recorded.

Figure 2:
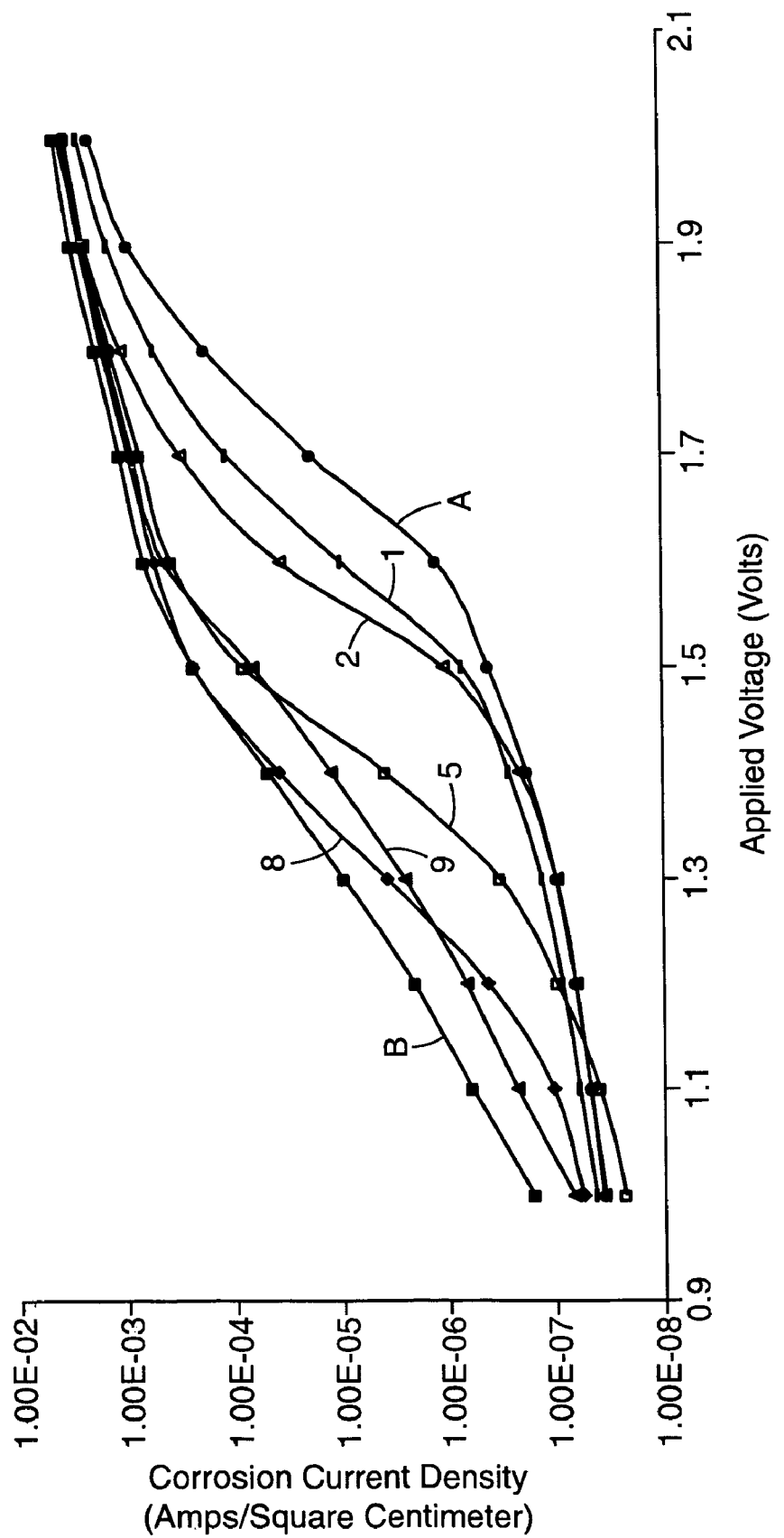
FIGS. 2-4 are graphs of corrosion current densities versus applied voltages for gas diffusion layers having microlayers of the present invention and for comparison gas diffusion layers excluding microlayers of the present invention.

Tables 3A and 3B provide the corrosion current densities (amps/square centimeter) versus applied voltages (1.0 volts-2.0 volts) for the samples of Examples 1, 2, 5, 8, and 9, and Comparative Examples A and B. FIG. 2 is a graph of the data provided in Tables 3A and 3B.

TABLE 3A

| Sample | 1.0 volt | 1.1 volts | 1.2 volts | 1.3 volts | 1.4 volts | 1.5 volts |
|---|---|---|---|---|---|---|
| Comparative Example A | 3.42E−08 | 4.79E−08 | 6.60E−08 | 9.80E−08 | 1.76E−07 | 4.10E−07 |
| Example 1 | 4.32E−08 | 6.11E−08 | 8.62E−08 | 1.33E−07 | 2.65E−07 | 7.39E−07 |
| Example 2 | 3.65E−08 | 4.69E−08 | 6.55E−08 | 9.66E−08 | 2.12E−07 | 1.09E−06 |
| Example 5 | 2.23E−08 | 3.99E−08 | 9.46E−08 | 3.29E−07 | 3.88E−06 | 8.28E−05 |
| Example 8 | 5.47E−08 | 1.05E−07 | 4.28E−07 | 3.80E−06 | 3.92E−05 | 2.32E−04 |
| Example 9 | 6.75E−08 | 2.24E−07 | 6.75E−07 | 2.55E−06 | 1.28E−05 | 6.90E−05 |
| Comparative Example B | 1.59E−07 | 5.96E−07 | 2.11E−06 | 9.61E−06 | 4.92E−05 | 2.32E−04 |

TABLE 3B

| Sample | 1.6 volts | 1.7 volts | 1.8 volts | 1.9 volts | 2.0 volts |
|---|---|---|---|---|---|
| Comparative Example A | 1.27E−06 | 1.98E−05 | 1.82E−04 | 9.11E−04 | 2.06E−03 |
| Example 1 | 9.85E−06 | 1.16E−04 | 5.27E−04 | 1.41E−03 | 2.63E−03 |
| Example 2 | 3.80E−05 | 3.16E−04 | 1.06E−03 | 2.36E−03 | 4.01E−03 |
| Example 5 | 3.72E−04 | 7.39E−04 | 1.35E−03 | 2.33E−03 | 3.49E−03 |

TABLE 3B-continued

| Sample | 1.6 volts | 1.7 volts | 1.8 volts | 1.9 volts | 2.0 volts |
|---|---|---|---|---|---|
| Example 8 | 5.32E−04 | 9.26E−04 | 1.57E−03 | 2.58E−03 | 3.81E−03 |
| Example 9 | 4.37E−04 | 8.62E−04 | 1.47E−03 | 2.51E−03 | 3.79E−03 |
| Comparative Example B | 6.65E−04 | 1.12E−03 | 1.85E−03 | 3.05E−03 | 4.39E−03 |

Figure 3:
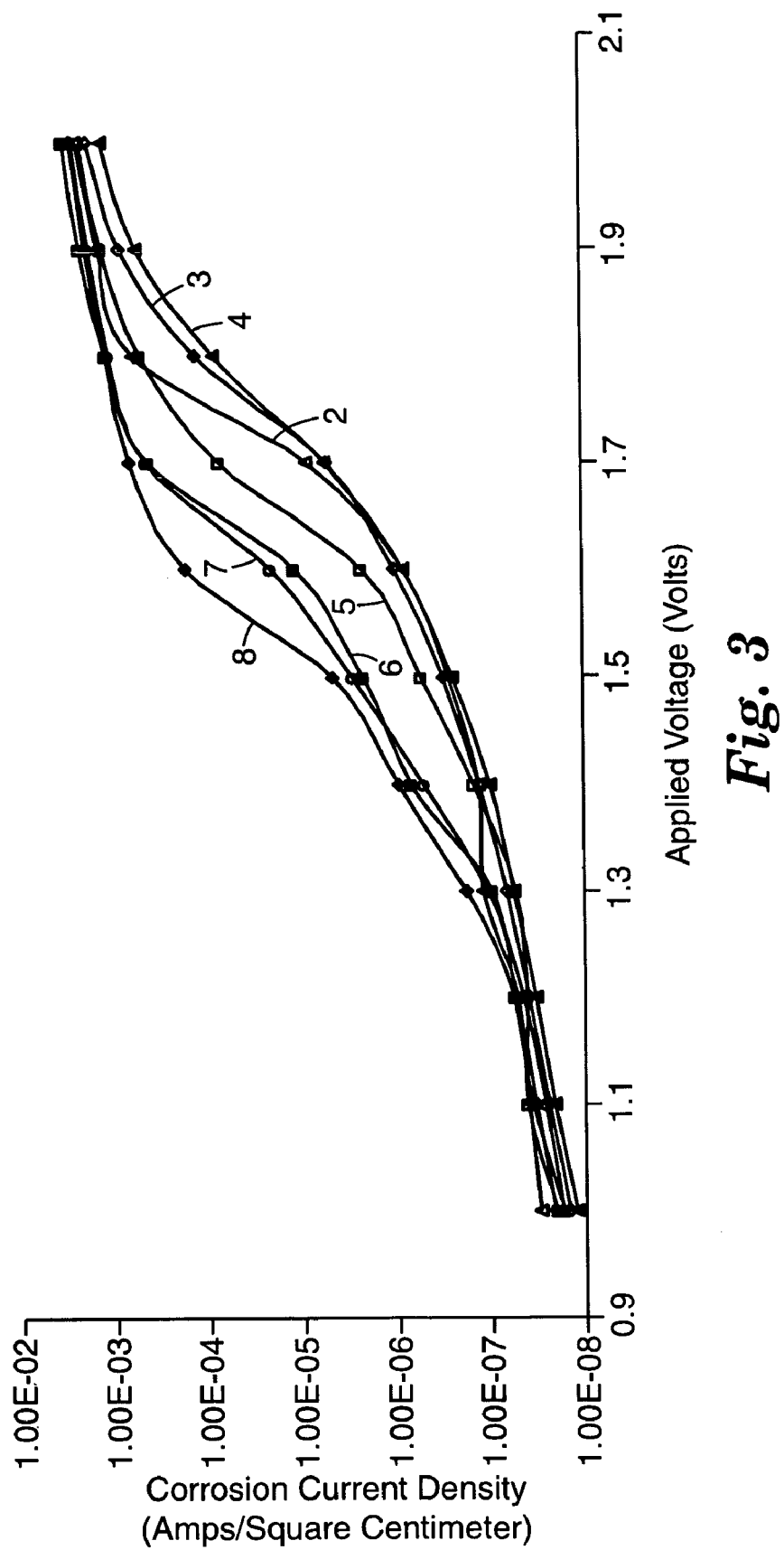

Tables 4A and 4B provide the corrosion current densities (amps/square centimeter) versus applied voltages (1.0 volts-2.0 volts) for the samples of Examples 2-8. FIG. 3 is a graph of the data provided in Tables 4A and 4B.

TABLE 4A

| Sample | 1.0 volt | 1.1 volts | 1.2 volts | 1.3 volts | 1.4 volts | 1.5 volts |
|---|---|---|---|---|---|---|
| Example 2 | 3.07E−08 | 3.96E−08 | 5.22E−08 | 1.20E−07 | 1.34E−07 | 2.75E−07 |
| Example 3 | 1.48E−08 | 2.49E−08 | 4.01E−08 | 6.65E−08 | 1.32E−07 | 3.09E−07 |
| Example 4 | 1.25E−08 | 2.18E−08 | 3.37E−08 | 5.57E−08 | 1.03E−07 | 2.45E−07 |
| Example 5 | 2.05E−08 | 4.21E−08 | 4.21E−08 | 5.47E−08 | 1.51E−07 | 5.17E−07 |
| Example 6 | 1.73E−08 | 3.62E−08 | 5.67E−08 | 9.80E−08 | 7.00E−07 | 2.19E−06 |
| Example 7 | 1.82E−08 | 2.72E−08 | 4.64E−08 | 1.04E−07 | 5.12E−07 | 2.82E−06 |
| Example 8 | 2.12E−08 | 3.35E−08 | 5.76E−08 | 1.81E−07 | 9.36E−07 | 4.67E−06 |

TABLE 4B

| Sample | 1.6 volts | 1.7 volts | 1.8 volts | 1.9 volts | 2.0 volts |
|---|---|---|---|---|---|
| Example 2 | 8.28E−07 | 8.92E−06 | 6.11E−04 | 1.42E−03 | 2.38E−03 |
| Example 3 | 1.01E−06 | 5.37E−06 | 1.34E−04 | 8.28E−04 | 1.83E−03 |
| Example 4 | 8.23E−07 | 5.67E−06 | 8.42E−05 | 5.52E−04 | 1.32E−03 |
| Example 5 | 2.34E−06 | 7.59E−05 | 4.98E−04 | 1.29E−03 | 2.23E−03 |
| Example 6 | 1.21E−05 | 4.20E−04 | 1.19E−03 | 2.17E−03 | 3.35E−03 |
| Example 7 | 2.11E−05 | 4.32E−04 | 1.05E−03 | 1.77E−03 | 2.63E−03 |
| Example 8 | 1.74E−04 | 6.60E−04 | 1.17E−03 | 1.90E−03 | 2.79E−03 |

The results provided in FIGS. 2 and 3, and in Tables 3A, 3B, 4A, and 4B show that the concentrations of FEP in the polymeric compositions of the given samples are generally inversely proportional to the corrosion current densities exhibited by the samples. As such, the concentrations of FEP in the polymeric compositions are generally proportional to the oxidative stability of the microlayers. Correspondingly, the concentrations of PTFE in the polymeric compositions of the samples are generally proportional to the corrosion current densities exhibited by the samples, and are generally inversely proportional to the oxidative stability of the microlayers.

As discussed above, it is believed the MP polymers (i.e., FEP) readily flow and distribute over the VXC carbon black particles. This reduces the total surface area of the VXC carbon black particles that is exposed to the oxidizing environments. In contrast, the NMP polymers (i.e., PTFE) generally do not flow or distribute over the VXC carbon black particles. As such, the samples with high concentrations of FEP in the polymeric compositions (e.g., Examples 1-5, and Comparative Example A) exhibit greater oxidative stability compared to samples with low concentrations of FEP in the polymeric compositions (e.g., Comparative Examples B).

Figure 4:
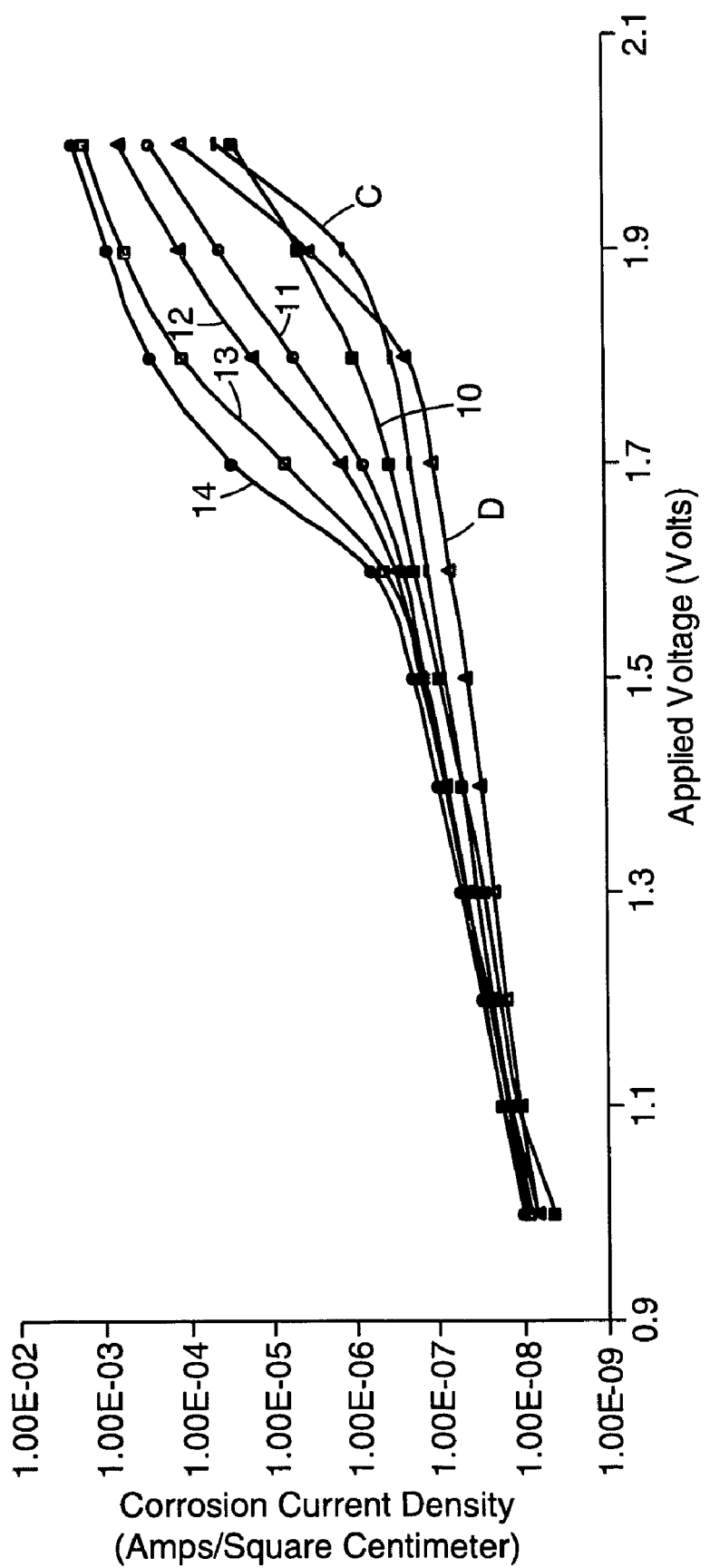

Tables 5A and 5B provide the corrosion current densities (amps/square centimeter) versus applied voltages (1.0 volts-2.0 volts) for the samples of Examples 10-14 and Comparative Example C and D. FIG. 4 is a graph of the data provided in Tables 5A and 5B.

TABLE 5A

| Sample | 1.0 volt | 1.1 volts | 1.2 volts | 1.3 volts | 1.4 volts | 1.5 volts |
|---|---|---|---|---|---|---|
| Comparative Example C | 9.33E−09 | 1.46E−08 | 2.24E−08 | 3.35E−08 | 5.07E−08 | 7.86E−08 |
| Example 10 | 4.21E−09 | 1.17E−08 | 1.82E−08 | 2.82E−08 | 4.83E−08 | 9.36E−08 |
| Example 11 | 8.03E−09 | 1.46E−08 | 2.57E−08 | 4.66E−08 | 7.73E−08 | 1.37E−07 |
| Example 12 | 7.00E−09 | 1.43E−08 | 2.41E−08 | 4.59E−08 | 7.93E−08 | 1.52E−07 |
| Example 13 | 8.23E−09 | 1.77E−08 | 2.77E−08 | 4.37E−08 | 7.59E−08 | 1.43E−07 |
| Example 14 | 9.95E−09 | 1.72E−08 | 2.95E−08 | 5.12E−08 | 9.61E−08 | 1.94E−07 |
| Comparative Example D | 6.75E−09 | 1.08E−08 | 1.56E−08 | 2.13E−08 | 2.93E−08 | 4.18E−08 |

TABLE 5B

| Sample | 1.6 volts | 1.7 volts | 1.8 volts | 1.9 volts | 2.0 volts |
|---|---|---|---|---|---|
| Comparative Example C | 1.25E−07 | 1.97E−07 | 3.35E−07 | 1.24E−06 | 4.36E−05 |
| Example 10 | 1.82E−07 | 3.57E−07 | 9.70E−07 | 4.40E−06 | 2.68E−05 |
| Example 11 | 2.50E−07 | 7.64E−07 | 4.98E−06 | 4.03E−05 | 2.57E−04 |
| Example 12 | 3.05E−07 | 1.36E−06 | 1.55E−05 | 1.21E−04 | 5.91E−04 |
| Example 13 | 4.11E−07 | 6.60E−06 | 1.14E−04 | 5.37E−04 | 1.50E−03 |
| Example 14 | 6.11E−07 | 2.82E−05 | 2.67E−04 | 8.33E−04 | 2.07E−03 |
| Comparative Example D | 6.90E−08 | 1.09E−07 | 2.25E−07 | 3.26E−06 | 1.13E−04 |

The results shown in FIG. 4, and Tables 5A and 5B show the same correlations between the concentrations of the polymeric compositions and the oxidative stability as discussed above for Examples 1-9 and Comparative Examples A and B. The exception to this is the gas diffusion layer of Comparative Example D, which exhibited the lowest corrosion current densities, despite having 100% PTFE in the polymeric composition. The results of Comparative Example D, which are not consistent with the previous results, are believed to be due to experimental error.

The corrosion current densities shown in of Examples 10-14 and Comparative Examples C and D exhibit less separation compared to the corrosion current densities for Examples 1-9 and Comparative Examples A and B. In particular, between applied voltages of about 1.0 volts to about 1.6 volts, the samples exhibited similar corrosion current densities despite having different polymeric compositions. This is believed to be due to the use of C55 carbon black particles rather the VXC carbon black particles. C55 carbon black is an acetylene carbon black, which exhibits greater oxidative stability compared to VXC carbon black. As such, the good oxidative stability of C55 carbon black is believed to mask the differences in oxidative stabilities that would otherwise be present. Nonetheless, the results in FIGS. 2 and 3, and Tables 3A, 3B, 4A, and 4B show the benefits of using MP polymers in the microlayers to improve oxidative stability.

Microlayer Strength Test for Examples 1, 2, 5, 8, and 9-14, and Comparative Examples A-D The microlayer strengths of the gas diffusion layers of Examples 1, 2, 5, 8, and 9-14, and Comparative Examples A-D were qualitatively measured to determine how component concentrations of the polymeric compositions affect the bonding adhesion of the microlayers. As discussed above, microlayers that exhibit chalky or powdery textures after sintering are believed to provide low bonding adhesion for securing the substrates to the catalyst coated membranes. Low bonding adhesion may result in reduced electrical conductivity between the substrates and the catalyst coated membranes, and may even cause the substrates to completely detach from the catalyst coated membranes.

The microlayer strength test was suitable for a quick and easy screening of the bonding adhesions of sample gas diffusion layers, and was performed on each gas diffusion layer pursuant to the following procedure. The given gas diffusion layer was placed on a smooth surface and was covered with a piece of standard paper. A 230 gram jar was then placed on the paper, above the sample. The paper was wide enough to prevent any contact between the jar and the gas diffusion layer. The paper was then slid horizontally, while the jar and the gas diffusion layer remained stationary. The jar was then removed, and the amount of carbon particles transferred to the paper was visually examined and ranked on a scale of 1-5. The amount of carbon particles transferred correlates to how chalky or powdery the given microlayers were after sintering. A rank of one denoted a heavy transfer of carbon particles (not desired) and a rank of five denoted a minimal transfer of carbon particles (desired).

Table 6 provides the rankings for amounts of carbon particles transferred for the samples of Examples 1, 2, 5, 8, and 9, and Comparative Examples A and B, which include VXC carbon black.

TABLE 6

| Sample | Percent by Weight of PTFE * | Percent by Weight of FEP * | Carbon Particle Transfer Ranking |
|---|---|---|---|
| Comparative Example A | 0 | 100 | (1) Heavy transfer |
| Example 1 | 10 | 90 | (1) Heavy transfer |
| Example 2 | 25 | 75 | (2) Moderate transfer |
| Example 5 | 50 | 50 | (2) Moderate transfer |
| Example 8 | 75 | 25 | (3) Some transfer |
| Example 9 | 90 | 10 | (2) Moderate transfer |
| Comparative Example B | 100 | 0 | (1) Heavy transfer |

* based on the entire weight of the polymeric composition.

Table 7 provides the rankings for amounts of carbon particles transferred for the samples of Examples 10-14, and Comparative Examples C and D, which include C55 carbon black.

TABLE 7

| Sample | Percent by Weight of PTFE * | Percent by Weight of FEP * | Carbon Particle Transfer Ranking |
|---|---|---|---|
| Comparative Example C | 0 | 100 | (2) Moderate transfer |
| Example 10 | 10 | 90 | (1) Heavy transfer |
| Example 11 | 25 | 75 | (2) Moderate transfer |
| Example 12 | 50 | 50 | (3.5) Some/slight transfer |
| Example 13 | 75 | 25 | (4) Slight transfer |
| Example 14 | 90 | 10 | (4) Slight transfer |
| Comparative Example D | 100 | 0 | (5) Minimal transfer |

* based on the entire weight of the polymeric composition.

The results provided in Tables 6 and 7 show that the amount of carbon particles transferred was generally proportional to the concentration of FEP in the polymeric composition, and generally inversely proportional to the concentrations of PTFE in the polymeric compositions. As such, this demonstrates that microlayers with high concentrations of FEP in the polymeric compositions generally exhibit lower bonding adhesion between the substrate and the catalyst coated membrane. Similarly, microlayers with high concentrations of PTFE in the polymeric compositions generally exhibit greater bonding adhesion between the substrate and the catalyst coated membrane. This is an opposing correlation compared to the oxidative stability of the microlayers.

A comparison of the results provided in Table 6 to the results provided in Table 7 show that the samples with C55 carbon black exhibited less carbon particle transfer compared to the samples with VXC carbon black.

Additionally, Example 9 and Comparative Example B exhibited high amounts of carbon particle transfer, despite having high concentrations of PTFE in the polymeric compositions. This may be due to the use of VXC carbon black particles, which exhibit different surface areas compared to the C55 carbon black. Nonetheless, the results of Example 14 and Comparative Example D in Table 7 show that high levels of PTFE provide good levels of bonding adhesion.

Bonding Adhesion Test for Examples 1, 2, 5, 8, and 9, and Comparative Examples A and B The bonding strengths of the samples of Examples 1, 2, 5, 8, and 9, and Comparative Examples A and B were qualitatively measured to determine how the component concentrations of the polymeric compositions affect the bonding adhesion provided by the microlayers. As discussed above, low bonding adhesion may result in reduced electrical conductivity, and may even cause the substrates to completely detach from the catalyst coated membranes.

The bonding adhesions were tested for each gas diffusion layer pursuant to the following procedure. Gas diffusion layers were bonded to each side of a CCM to form a membrane electrode assembly. The bonding was performed with a static press at a pressure of 1.36 metric tons/50 square centimeters (1.5 tons/50 cm$^2$), and at a temperature of 132° C. for 10 minutes. The static press was commercially available under the trade designation "Carver Model #2518 Static Press" from Fred S. Carver, Inc., Wabash, Ind. Each sample was then suspended and the bonding adhesion of the microlayers were visually examined and ranked on a scale of 1-5. A rank of one denoted that both sample gas diffusion layers detached from the CCM (not desired) and a rank of five denoted that both sample gas diffusion layers remained fully bonded to the CCM (desired). Table 8 provides the rankings for bonding adhesion for the samples of Examples 1, 2, 5, 8, and 9, and Comparative Examples A and B.

TABLE 8

| Sample | Percent by Weight of PTFE* | Percent by Weight of FEP* | Bonding Adhesion Ranking |
| --- | --- | --- | --- |
| Comparative Example A | 0 | 100 | (1) Both sides detached |
| Example 1 | 10 | 90 | (1) Both sides detached |
| Example 2 | 25 | 75 | (2) One side detached |
| Example 5 | 50 | 50 | (3) Both sides loosely attached |
| Example 8 | 75 | 25 | (5) Both sides fully bonded |
| Example 9 | 90 | 10 | (4) Marginal bonding on both sides |
| Comparative Example B | 100 | 0 | (4) Marginal bonding on both sides |

* based on the entire weight of the polymeric composition.

The results provided in Table 8 show that the bonding adhesion is generally inversely proportional to the concentration of FEP in the polymeric composition, and is generally proportional to the concentration of PTFE in the polymeric composition. The lower bonding adhesions for the samples of Example 9 and Comparative Example B are again believed to be due to the use of VXC carbon black.

As shown in the above results, oxidative stability and bonding adhesion exhibit opposing trends with respect to the concentrations of the NMP polymers (e.g., PTFE) and the MP polymers (e.g., FEP) in the polymeric composition. An increase in concentration of the NMP polymers in the polymeric composition generally increases the bonding adhesion, but generally reduces the oxidative stability. In contrast, increases in concentration of the MP polymers in the polymeric composition generally increases the oxidative stability, but generally reduces the bonding adhesion. The suitable and particularly suitable concentration ranges for the polymeric composition, as discussed above, provide good oxidative stability and good bonding adhesion for use with microlayers of the present invention.

Although the present invention has been described with reference to preferred embodiments, workers skilled in the art will recognize that changes may be made in form and detail without departing from the spirit and scope of the invention.

The invention claimed is:

1. An polymer electrolyte membrane fuel cell membrane electrode assembly comprising:
   an electrolyte membrane having a surface;
   a catalyst layer disposed adjacent the surface of the electrolyte membrane;
   a microlayer disposed adjacent the catalyst layer, opposite the electrolyte membrane, wherein the microlayer comprises carbon particles and a polymeric composition, wherein the polymeric composition comprises first highly-fluorinated polymers that are non-melt processable and second highly-fluorinated polymers that are melt processable; and
   an electrically conductive porous substrate comprising carbon fiber upon which is coated the microlayer; the microlayer being disposed between the electrically conductive porous substrate and the catalyst layer.

2. The fuel cell membrane electrode assembly of claim 1, wherein the first highly-fluorinated polymers have melt flow indices less than about 0.5 grams/10 minutes.

3. The fuel cell membrane electrode assembly of claim 1, wherein the second highly-fluorinated polymers have melt flow indices of at least about one gram/10 minutes.

4. A fuel cell power plant comprising the fuel cell membrane electrode assembly according to claim 1.

5. An automobile comprising the fuel cell membrane electrode assembly according to claim 1.

6. The fuel cell membrane electrode assembly according to claim 1, wherein the second highly-fluorinated polymers have melt flow indices ranging from about five grams/10 minutes to about ten grams/10 minutes.

7. The fuel cell membrane electrode assembly according to claim 1, wherein the first highly-fluorinated polymers constitute about 25% to about 70% of the polymeric composition, by weight.

8. The fuel cell membrane electrode assembly according to claim 1, wherein the first highly-fluorinated polymers constitute about 30% to about 50% of the polymeric composition, by weight.

9. The fuel cell membrane electrode assembly according to claim 1, wherein the carbon particles constitute about 50% by weight to about 90% by weight of the microlayer.

10. The fuel cell membrane electrode assembly according to claim 1, wherein the first highly-fluorinated polymers are selected from a group consisting of polytetrafluoroethylene, copolymers of tetrafluoroethylene and perflucroalkylvinylethers, and combinations thereof.

11. The fuel cell membrane electrode assembly according to claim 1, wherein the second highly-fluorinated polymers are selected from a group consisting of fluorinated ethylene propylene, perfluoroalkoxyalkane, perfluoroalkyl acrylate, hexafluoropropylene copolymers, terpolymers of tetrafluoroethylene/hexafluoropropylene/vinylidene fluoride, copolymers of tetrafluoroethylene and ethylene, and combinations thereof.

12. The fuel cell membrane electrode assembly according to claim 1, wherein the carbon particles comprise graphitized carbon particles.

* * * * *

UNITED STATES PATENT AND TRADEMARK OFFICE
CERTIFICATE OF CORRECTION

PATENT NO. : 7,608,334 B2  Page 1 of 1
APPLICATION NO. : 11/092017
DATED : October 27, 2009
INVENTOR(S) : Joseph W. Frisk It is certified that error appears in the above-identified patent and that said Letters Patent is hereby corrected as shown below:

Title Page
Item [56] References Cited, OTHER PUBLICATIONS,
    delete "Litster; S., et ai.," and insert -- Litster, S., et al., -- therefor.

Column 2
Line 48, delete "such as." and insert -- such as -- therefor.

Column 3
Line 66, delete "Graphitized: carbon particles:"
    and insert -- Graphitized carbon particles -- therefor.

Column 4
Line 17-18, delete "perluoroalkylvinylethers"
    and insert -- perfluoroalkylvinylethers -- therefor.

Column 6
Line 63, delete "CCCM" and insert -- CCM -- therefor.

Column 16
Line 48-49, delete "perflucroalkylvinylethers"
    and insert -- perfluoroalkylvinylethers -- therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,608,334 B2
APPLICATION NO. : 11/092017
DATED : October 27, 2009
INVENTOR(S) : Frisk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Twelfth Day of October, 2010

David J. Kappos
*Director of the United States Patent and Trademark Office*